United States Patent
Scoccia

[19]
[11] Patent Number: 5,937,891
[45] Date of Patent: Aug. 17, 1999

[54] AUTOMATIC HVAC HOUSING VALVE DOOR WITH TOLERANCE COMPENSATING RETURN MECHANISM

[75] Inventor: Ardeean Scoccia, Amherst, N.Y.

[73] Assignee: General Motors Corporation, Detroit, Mich.

[21] Appl. No.: 09/031,166

[22] Filed: Feb. 26, 1998

[51] Int. Cl.[6] .......................... F16K 31/46; F16K 31/524
[52] U.S. Cl. ............................ 137/351; 251/62; 251/228; 251/303
[58] Field of Search .................................. 137/907, 351; 251/228, 303, 62

[56] References Cited

U.S. PATENT DOCUMENTS

| | | | |
|---|---|---|---|
| 3,481,361 | 12/1969 | Brewer et al. .......................... | 137/351 |
| 4,717,121 | 1/1988 | Hashimoto .............................. | 251/228 |
| 5,430,511 | 7/1995 | Paff et al. ................................ | 354/81 |
| 5,626,516 | 5/1997 | Peterson ................................. | 137/907 |

*Primary Examiner*—A. Michael Chambers
*Assistant Examiner*—Bryan Wallace
*Attorney, Agent, or Firm*—Patrick M. Griffin

[57] ABSTRACT

A valve flapper door return spring mechanism for an automotive HVAC housing is modified so as to compensate for tolerance variations, so that the door is held in a substantially rattle free return position regardless. One of a pair of resilient spring fingers sits in a V shaped notch created by the intersection of a pair of spring finger stop surfaces that are opposed in slope. The one spring finger can therefore continually seat itself into an equilibrium position at the bottom of the V, and always make solid contact.

3 Claims, 3 Drawing Sheets

AUTOMATIC HVAC HOUSING VALVE DOOR WITH TOLERANCE COMPENSATING RETURN MECHANISM

TECHNICAL FIELD

This invention relates to automotive heating, ventilation and air conditioning system housings in general, and specifically to a rotatable, flapper type valve door within such a housing having a novel return mechanism that compensates for an expected range of tolerance variation in the various components.

BACKGROUND OF THE INVENTION

Automotive heating, ventilation and air conditioning (HVAC) systems utilize a large, hollow housing that contains various heat exchangers, blowers, outlets and rotatable valve doors that direct air flow to and through the various other components and features, depending upon their rotated position. The majority of a typical flapper type valve door, the paddle like door itself and its rotating shaft, is contained within the housing. The end of the shaft, however, extends outside the housing outer wall so as to be accessible to power actuators that rotate the shaft and door to its various positions. The outer end of the shaft is attached to a lever, the end or ends of which can be pushed or pulled by the actuator to rotate the shaft. The door has a neutral position to which it is automatically and passively returned by a spring. Therefore, the actuator need only release the lever to allow the door to spring return to a repeatable, defined starting position. However, because of relative tolerance stack ups among the various structural features that cooperate with the spring to create the passive return action, the door is sometimes subject to a slight rotational play or rattle in its neutral position.

Typically, the return spring is a coil type spring with a cylindrical body fitted over the end of the shaft and a pair of spring fingers that extend out therefrom. The spring fingers are arranged so as to be continually forcefully biased toward one another, and will pinch inwardly and tightly against any intervening structure. This inward pinching action is used to pull a pair of first opposed stop edges on the shaft into substantial parallel alignment with a pair of second opposed stop edges on the housing. So long as the two pairs of edges can in fact be moved into an aligned, parallel relation, then the spring fingers can closely, tightly contact all four edges, and the door will be rattle free in its neutral position. However, because of tolerance stack ups, a condition may occur where one spring finger can rest solidly against one pair of stop edges, but will not touch one edge of the other pair of edges. This leaves the door vulnerable to play and rattle.

SUMMARY OF THE INVENTION

The subject invention provides a modified return mechanism that maintains the valve door in a solid, stable, rattle free condition regardless of expected tolerance stack ups.

In the preferred embodiment disclosed, the valve door, shaft, and return spring, and the two spring finger stop edges on the housing are as described above. One of the stop edges on the shaft, however, is sloped steeply in one direction, so that separation from the other edge varies, over its edge length, to a degree matching that of the probable tolerance stack up range. The corresponding stop edge on the housing is sloped at least slightly in the opposite direction, at least in relation to the more steeply oppositely sloped shaft spring finger stop edge. The two overlap, therefore, in a basic V shape. One of the spring fingers seats closely against the unmodified pair of spring finger stop edges, pulling them into a standard aligned, parallel relationship. The other spring finger seats itself into an equilibrium position at the bottom of the V shape, and is able to move back and forth, from unit to unit, as the tolerance range varies, always remaining in solid contact with both edges. Therefore, a solid, rattle free door return position is always attained and maintained.

BRIEF DESCRIPTION OF THE DRAWINGS

These and other features of the subject invention will appear from the following written description, and from the drawings, in which.

DESCRIPTION OF THE PREFERRED EMBODIMENT

Figure 1:
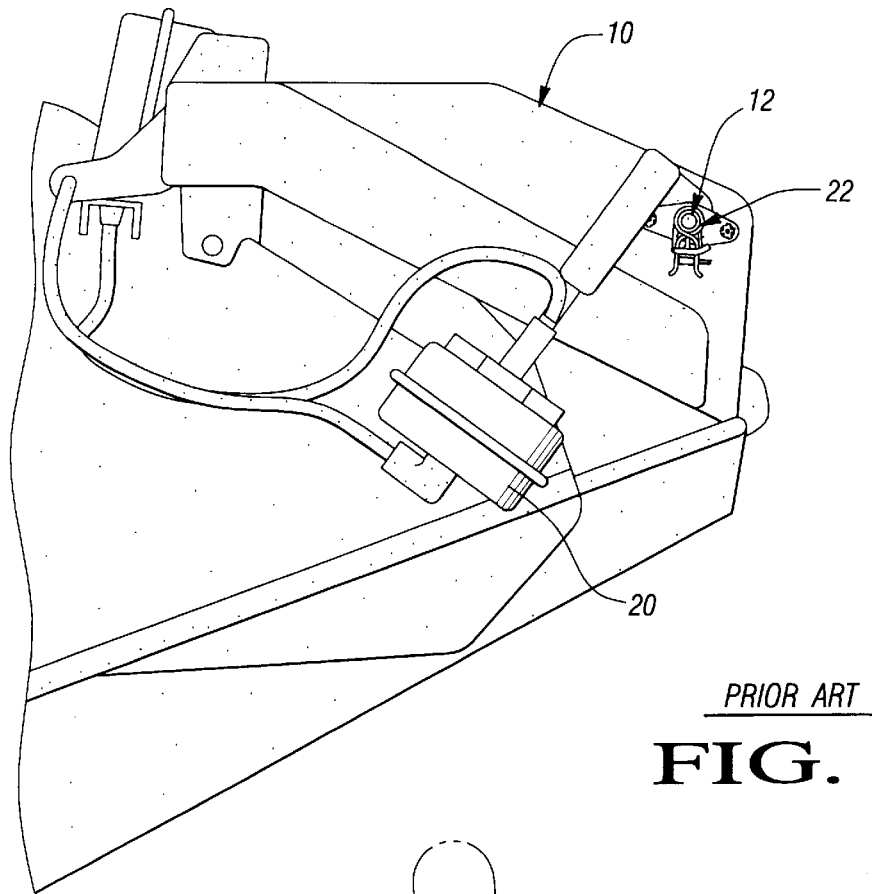
FIG. 1 is a view of the exterior of an HVAC housing showing the general location of a prior art valve door shaft, lever and return spring.
Figure 2:
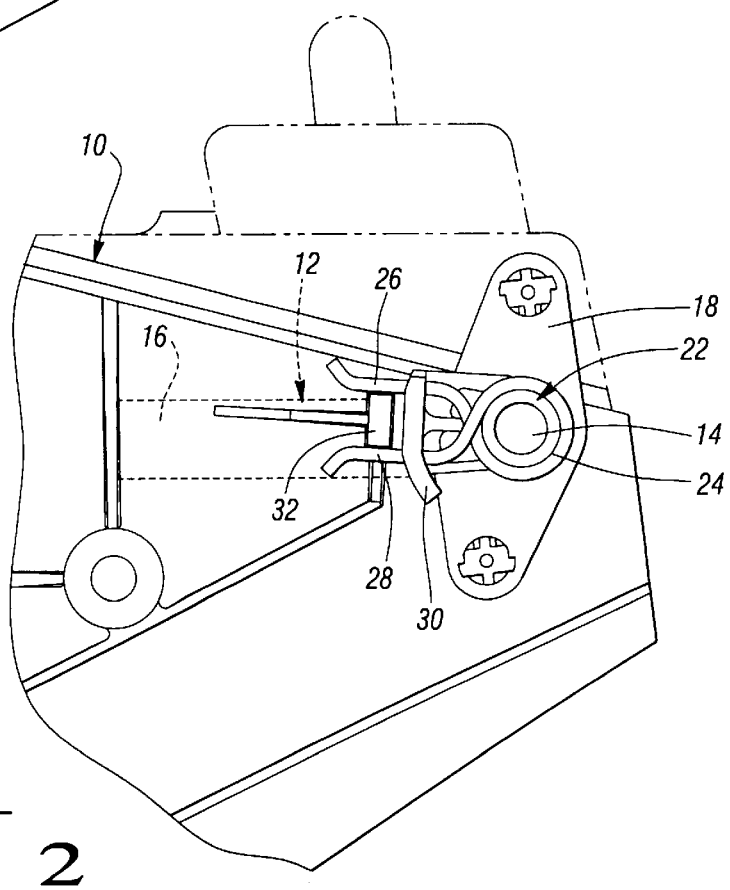
FIG. 2 is an enlarged view of the end of the shaft, showing the neutral position of the door in dotted lines.
Figure 3:
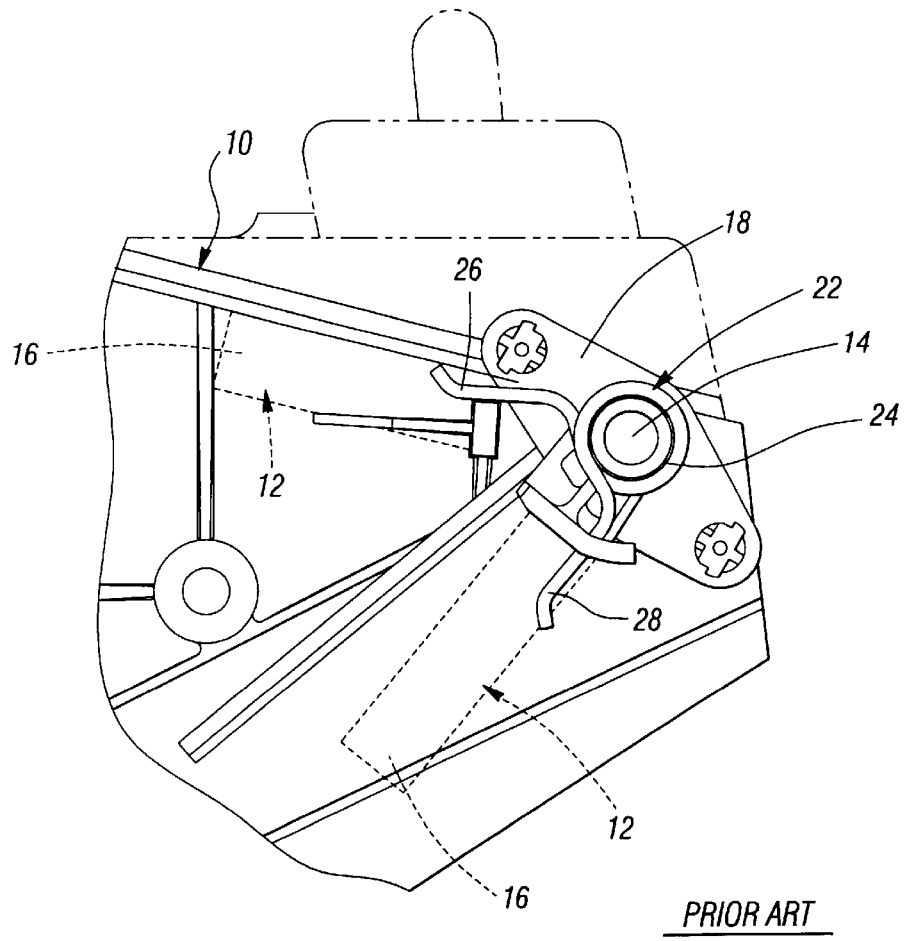
FIG. 3 is a view similar to FIG. 2, and shows the rotated up and down positions of the door in dotted lines, and showing the condition of the return spring when the door is rotated down.

Referring first to FIGS. 1 through 3, an automotive HVAC housing, indicated generally at 10, is basically a large, multi-section hollow plastic box, within which other components, such as heat exchangers, blowers, sensors and valves, are contained and operate. One such component is a valve door, indicated generally at 12, which has a rotating main shaft 14 with a central axis A, and a flapper-like body 16. Central axis A serves as a convenient reference frame for the description of other structural surface features described below. The length of shaft 14 is journaled within housing 10, and its rotation back and forth swings the door body 16 back and forth between selected positions. As disclosed, shaft 14 is rotated by a lever 18 fixed to shaft 14, inboard of the end thereof, which is pushed or pulled back and forth by a conventional actuator 20. As the lever 18 is twisted back and forth, door 12 swings back and forth about axis A between an "upper" active position, and a "lower" active position, both shown in FIG. 3. "Upper" and "lower", of course, indicate only the orientation of the drawing on the page. What is more significant is that the FIG. 2 "neutral" or return position of door 12 lies between the two active positions, and that it is returned to automatically and passively whenever the actuators 20 are released. The return mechanism for door 12 is powered by a coil type return spring, indicated generally at 22. Spring 22 has a central coil body 24 wrapped concentrically around the end of shaft 14, and a pair of spring fingers that extend out therefrom, an "upper" finger 26 and a "lower" finger 28. Fingers 26 and 28 are essentially identical, but their separate designation simplifies the description. The spring arms 26 and 28 are pulled past one another from a widely spaced free state position, not illustrated, and are thus biased very strongly toward one another as seen in FIG. 2. Thus, they tend to pinch or clamp just as strongly against any intervening solid structure, a characteristic that is used to create the return position shown in FIG. 2.

Figure 4:
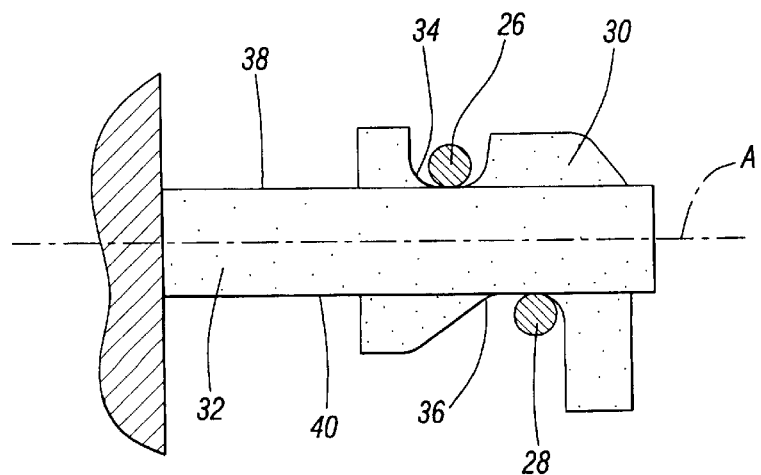
FIG. 4 is a side view of just the corresponding pairs of spring finger stop edges, viewed straight on, with the spring fingers in an ideal, completely contacting relation thereto.

Referring next to FIGS. 2 through 4, the solid structures that are clamped between the spring fingers 26 and 28 are two, a moving swing arm 30 that is integral to the shaft 14, and a stationary boss 32 that is molded integrally to housing 10. Four different edges of these two structures are engaged by the spring fingers 26 and 28 in order to return door 12 to its neutral position, and to create and define that neutral position. Swing arm 30 is offset from shaft axis A, and swings about axis A as door shaft 14 rotates. Two notches are cut into swing arm 30, at the bottoms of which lie two opposed stop edges, an upper edge 34 and lower edge 36. The two swing arm edges 34 and 36 are spaced from one another far enough to hold the spring fingers 26 and 28 apart and in a substantially parallel relation, and are both basically parallel to the central axis A as well. On housing boss 32, two longer opposed stop edges, upper edge 38 and lower edge 40, are also both substantially parallel to the central axis A and also, at least ideally, spaced apart substantially equally to the swing arm edges 34 and 36. The spring fingers 26 and 28 are snapped down into the notches when coil body 24 is installed over the end of shaft 14. As the fingers 26 and 28 pinch together, they contact the four stop edges, with upper spring finger 26 engaging the two upper edges 34 and 38, and with lower spring finger 28 engaging the two lower edges 36 and 40, as shown in FIG. 4. This holds door 12 in the neutral position of FIG. 2, and defines that position. If door shaft 14 is rotated in either direction, for example, downwardly as shown in FIG. 3, then the swing arm 30 rotates down with it, the upper spring arm 26 stays against the two upper edges 34 and 38, and the lower swing arm edge 36 forces spring arm 28 down and away from the boss lower edge 40. Upon release of the door 12, it returns to the FIG. 2 neutral position. However, four point, solid contact in the FIG. 2 position is assured only if the tolerances in the various parts comprising housing 10 and door 12 are nominal.

Figure 5:
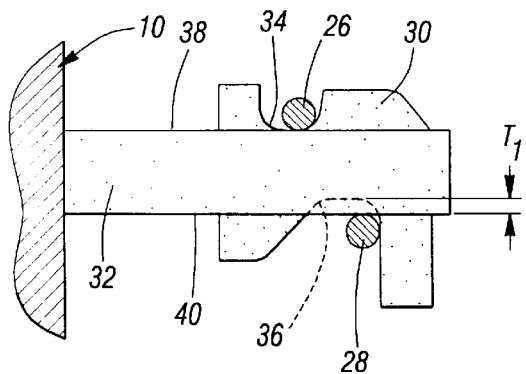
FIG. 5 is a view like FIG. 4, but showing a deviation in one direction from the ideal.
Figure 6:
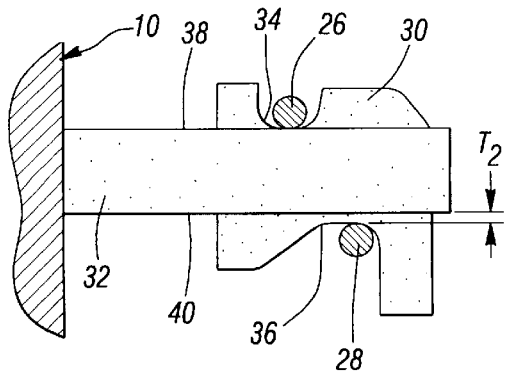
FIG. 6 is a view like FIG. 5, but showing a deviation in the opposite direction.
Figure 7:
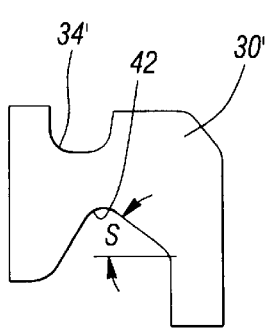
FIG. 7 is a view of just the shaft spring finger stop edges according to the invention.

Referring next to FIGS. 5 and 6, the situation when the tolerances are out of the ideal range is illustrated. In FIG. 5, while the upper spring finger 26 sits tightly to the two aligned upper stop edges 34 and 38, the swing arm lower edge 36 is not aligned with the boss lower edge 40, but is offset upwardly therefrom by a tolerance gap T1. Therefore, lower spring finger 26 does not sit tight to both of the lower stop edges 36 and 40. Consequently, the return position of door 12 is not solidly defined and maintained, and it can rattle up or down slightly. The situation could be reversed, with the two upper stop edges 34 and 38 out of alignment. In effect, excessive, out of tolerance width between the housing boss edges 38 and 40, or some other out of tolerance condition, causes the stop edges 38 and 40 on boss 32 to hold the spring fingers 26 and 28 too far apart to contact both of the stop edges 34 and 36 on shaft swing arm 30 at once. Or, as shown in FIG. 6, the tolerance stack up could be off by T2 in the other direction, causing the two stop edges 34 and 36 on the shaft swing arm 30 to hold the spring fingers 26 and 28 too far apart to be able to contact both of the housing boss edges 38 and 40 at once. Either condition allows the door 12 to rattle slightly in its neutral position.

Figure 8:
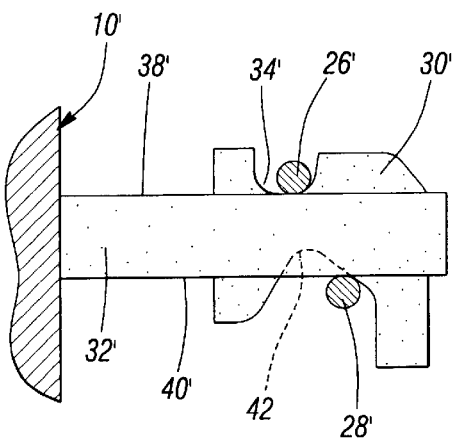
FIG. 8 is a view from the same perspective as FIG. 4, but showing the modified structure of FIG. 7 in relation to the corresponding spring stop finger edges on the housing, and also showing the lower spring finger deviated in one direction from the ideal.
Figure 9:
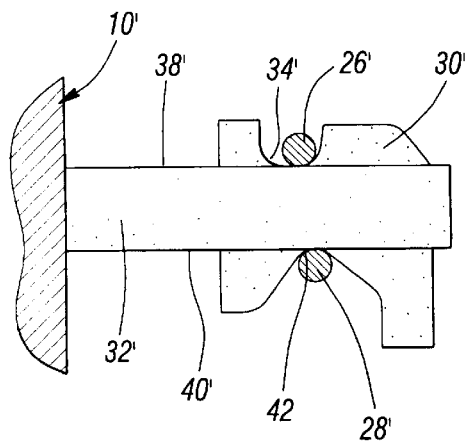
FIG. 9 is a view similar to FIG. 8, but showing the lower spring finger deviated in the other direction from the ideal.
Figure 10:
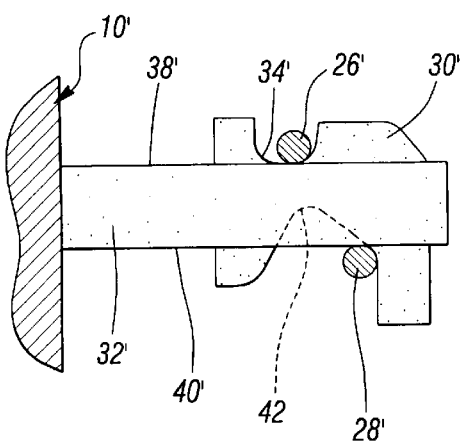
FIG. 10 is a view similar to FIG. 8, but showing the lower spring finger deviated in the opposite direction.

Referring next to FIGS. 7 through 10, the improvement of the invention can be very succinctly described, in light of the explication of the basic problem given above. The housing 10, door 12, door body 16, lever 18, housing boss 32, and spring 22, and most of the features thereon, are all basically identical, and given the same number with a prime. However, at least one of the swing arm stop edges, the lower edge as shown, is modified significantly, and this is indicated with a new number at 42. Rather than being parallel to the axis A, the modified swing arm lower stop edge 42 is sharply sloped, over a length sufficient to give it a component perpendicular to axis A of a width S. The width S, in turn, is large enough to encompass the total expected tolerance range of T1 plus T2 as defined above. Consequently, when the door 12' is released to return to its neutral position, as shown in FIG. 8, the boss lower edge 40' and the modified swing arm lower stop edge 42 will cross at some single point. The boss lower edge 40', though it need not be modified, will still be sloped oppositely to the corresponding and steeply sloped swing arm lower stop edge 42, and will, in effect, form a V shape therewith that converges toward the other two stop edges 34' and 38'. Now, when the tolerance stack ups act on the swing arm 30' and the boss 32 in the same fashion as described above, the spring fingers 26' and 28' can always make solid, four point contact. This is because the sloped swing arm lower stop edge 42 and (relatively) oppositely sloped boss lower stop edge 40' will always cross at the single point, and the lower spring finger 28', as it pinches inwardly toward the upper spring finger 26', will self seat into a solid, equilibrium position at the bottom of the V, in effect. This is illustrated in FIGS. 9 and 10, which correspond to the same two extremes of tolerance stack up as FIGS. 5 and 6 above. The door 12' will now be held in a solid, stable, and rattle free condition by the spring 22' regardless of any out of tolerance conditions.

Variations in the disclosed embodiment could be made. The spring fingers 26' and 28' need only be fixed to the end of shaft 14, and extend out generally perpendicular to the axis A and past the two corresponding pairs of spring finger stop edges 34'-38' and 42-40'. It is particularly convenient if the spring fingers 26' and 28' are also integral to the coil body 24', which can be easily installed concentrically over the end of shaft 14 and into the notches in the swing arm 30'. It would be possible to more steeply slope the lower boss spring finger stop edge 40' relative to the axis A, and in a direction opposed to the slope of the lower shaft spring finger stop edge 42, to create a sharper relative V shape at the overlap. Therefore, it will be understood that it is not intended to limit the invention to just the embodiment disclosed.

I claim:

1. In an automotive heating and air conditioning system housing having a valve door with a shaft rotatably mounted thereto, said shaft also having a lever finger that is pushed or pulled from a neutral position to rotate said shaft about an axis in either direction and move said valve door to an active position, a reset mechanism to automatically return said door to said neutral position and maintain it solidly in said neutral position regardless of an expected range of tolerance variation in the manufacture and assembly of said shaft and housing, comprising;

a pair of opposed spring finger stop edges on said shaft offset from said shaft axis, a first of which is oriented substantially parallel to said shaft axis and the second of which is sloped relative to the first so that its separation from the first varies over a range at least equal to said expected tolerance range, a corresponding pair of first and second opposed spring finger stop edges on said housing, said first housing edge being substantially coplanar to said first shaft edge when said door is in its neutral position, said second housing edge being sloped at least slightly in the opposite direction relative to said second shaft edge so as to intersect therewith, when said door is in its neutral position, in a general V shape that converges toward said first edges, first and second spring fingers extending out from said shaft which are continually biased forcefully toward one another, said spring fingers extending over both pairs of respective first and second spring finger stop edges, said second spring finger acting to seat itself continually into an equilibrium position in the V shape formed by said intersecting second edges regardless of tolerance variations, thereby maintaining said second spring finger in solid, continual contact with both second spring finger stop edges and maintaining said first spring finger in solid, continual contact with both first spring finger stop edges, so as to retain said door in a stable, substantially rattle free neutral position.

2. In an automotive heating and air conditioning system housing having a valve door with a shaft rotatably mounted thereto, said shaft also having a lever finger that is pushed or pulled from a neutral position to rotate said shaft about an axis in either direction and move said valve door to an active position, a reset mechanism to automatically return said door to said neutral position and maintain it solidly in said neutral position regardless of an expected range of tolerance variation in the manufacture and assembly of said shaft and housing, comprising;

a pair of opposed spring finger stop edges on said shaft offset from said shaft axis, a first of which is oriented substantially parallel to said shaft axis and the second of which is sloped relative to the first so that its separation from the first varies over a range at least equal to said expected tolerance range, a corresponding pair of first and second opposed spring finger stop edges on said housing, said first housing edge being substantially coplanar to said first shaft edge when said door is in its neutral position, said second housing edge being sloped at least slightly in the opposite direction relative to said second shaft edge so as to intersect therewith, when said door is in its neutral position, in a general V shape that converges toward said first edges, a coil type return spring, said spring having a coil body substantially concentric to said shaft and having first and second spring fingers extending out from said spring body which are continually biased forcefully toward one another, said spring fingers extending over both pairs of respective first and second spring finger stop edges, said second spring finger acting to seat itself continually into an equilibrium position in the V shape formed by said intersecting second edges regardless of tolerance variations, thereby maintaining said second spring finger in solid, continual contact with both second spring finger stop edges and maintaining said first spring finger in solid, continual contact with both first spring finger stop edges, so as to retain said door in a stable, substantially rattle free neutral position.

3. In an automotive heating and air conditioning system housing having a valve door with a shaft rotatably mounted thereto, said shaft also having a lever finger that is pushed or pulled from a neutral position to rotate said shaft about an axis in either direction and move said valve door to an active position, a reset mechanism to automatically return said door to said neutral position and maintain it solidly in said neutral position regardless of an expected range of tolerance variation in the manufacture and assembly of said shaft and housing, comprising;

a swing arm integral to said shaft and having pair of opposed spring finger stop edges on said shaft offset from said shaft axis, a first of which is oriented substantially parallel to said shaft axis and the second of which is sloped relative to the first so that its separation from the first varies over a range at least equal to said expected tolerance range, a stationary boss integral to said housing and having a corresponding pair of first and second opposed spring finger stop edges on said housing, said first housing edge being substantially coplanar to said first shaft edge when said door is in its neutral position, said second housing edge being sloped at least slightly in the opposite direction relative to said second shaft edge so as to intersect therewith, when said door is in its neutral position, in a general V shape that converges toward said first edges, a coil type return spring, said spring having a coil body substantially concentric to said shaft and having first and second spring fingers extending out from said spring body which are continually biased forcefully toward one another, said spring fingers extending over both pairs of respective first and second spring finger stop edges, said second spring finger acting to seat itself continually into an equilibrium position in the V shape formed by said intersecting second edges regardless of tolerance variations, thereby maintaining said second spring finger in solid, continual contact with both second spring finger stop edges and maintaining said first spring finger in solid, continual contact with both first spring finger stop edges, so as to retain said door in a stable, substantially rattle free neutral position.

* * * * *